US009182769B2

(12) United States Patent
Yamaguchi

(10) Patent No.: US 9,182,769 B2
(45) Date of Patent: Nov. 10, 2015

(54) POWER SUPPLY DEVICE, AND VEHICLE-MOUNTED APPARATUS AND VEHICLE USING SAME

(71) Applicant: Rohm Co., Ltd., Kyoto (JP)

(72) Inventor: Yuhei Yamaguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 206 days.

(21) Appl. No.: 13/920,249

(22) Filed: Jun. 18, 2013

(65) Prior Publication Data

US 2013/0335047 A1 Dec. 19, 2013

(30) Foreign Application Priority Data

Jun. 19, 2012 (JP) .................................. 2012-137677

(51) Int. Cl.
G05F 1/46 (2006.01)
(52) U.S. Cl.
CPC ...................................... *G05F 1/468* (2013.01)

(58) Field of Classification Search
CPC ......................................................... G05F 1/468
See application file for complete search history.

(56) References Cited

U.S. PATENT DOCUMENTS

2011/0181113 A1* 7/2011 Hung et al. .................... 307/34
2012/0181931 A1* 7/2012 Katsura .......................... 315/82

FOREIGN PATENT DOCUMENTS

JP 2010-081749 4/2010
JP 2011-061971 3/2011

* cited by examiner

*Primary Examiner* — Emily P Pham
(74) *Attorney, Agent, or Firm* — Fish & Richardson P.C.

(57) ABSTRACT

A power supply device includes: a control circuit that turns on and off an output transistor to generate an output voltage from an input voltage; an internal power supply voltage generation circuit that generates an internal power supply voltage from an external power supply voltage; and a power switching circuit that switches supply of the internal power supply voltage and supply of the output voltage as a drive voltage of the control circuit.

11 Claims, 10 Drawing Sheets

POWER SUPPLY DEVICE, AND VEHICLE-MOUNTED APPARATUS AND VEHICLE USING SAME

CROSS-REFERENCE TO RELATED APPLICATIONS

This application is based on Japanese Patent Application No. 2012-137677 filed in Japan on Jun. 19, 2012, the contents of which are hereby incorporated by reference.

BACKGROUND OF THE INVENTION

1. Field of the Invention

The present invention relates to a power supply device, and a vehicle-mounted apparatus and a vehicle using such a power supply device.

2. Description of the Related Art

Attention has recently been focused on low-power consumption power supply devices in the field of automobiles. In general, as the low-power consumption power supply device, there are two types, that is, a LDO (low drop-out) regulator and a switching regulator (chipper-type DC/DC converter).

In the low-power consumption power supply device, it is important how an input current is reduced. When it is assumed that the input current is Iin, an output current is Iout, an input voltage is Vin and an output voltage is Vout, the input and output current characteristics of the LDO regulator and the switching regulator can be expressed by formulas (1a) and (1b), respectively.

[Formula 1]

$$Iin = Iout \quad (1a)$$

$$Iin = \frac{Vout}{Vin} \cdot Iout \quad (1b)$$

It is found from formula (1b) above that, in the step-down (Vin>Vout) switching regulator, a relationship of Iin<Iout holds true. In other words, advantageously, since in the switching regulator, the input current Iin can be reduced as compared with the LDO regulator, the reduction in power consumption is easily realized.

As examples of conventional technology related to what has been described above, JP-A-2010-81749 and JP-A-2011-61971 can be taken.

However, formula (1b) above is an ideal formula that holds true only when the power efficiency ξ of the switching regulator is 1; the actual input current Iin is 1/ξ (where 0<ξ<1) in an ideal state as shown in formula (2) below. Hence, as the power efficiency ξ is decreased, the input current Iin is inevitably increased.

[Formula 2]

$$Iin = \frac{Vout}{Vin} \cdot Iout \cdot \frac{1}{\xi} \quad (2)$$

As a factor for determining the power efficiency ξ, the internal consumption current Icc of the switching regulator can be taken. In the following description, the effects of the internal consumption current Icc on the power efficiency ξ will be discussed, using an example where Icc=300 μA.

In a first case, when a load state (heavy load state) where Vin=12V, Vout=6V and Iout=2A is assumed, the input current Iin is calculated by formula (3) below.

[Formula 3]

$$Iin = \frac{6\,V}{12\,V} \times 2\,A + 300\,\mu A \quad (3)$$
$$= 1\,A + 300\,\mu A$$
$$\cong 1\,A (\xi \cong 1)$$

On the other hand, in a second case, when a load state (light load state) where Vin=12V, Vout=6V and Iout=300 μA is assumed, the input current Iin is calculated by formula (4) below.

[Formula 4]

$$Iin = \frac{6\,V}{12\,V} \times 300\,\mu A + 300\,\mu A \quad (4)$$
$$= 150\,\mu A + 300\,\mu A$$
$$= 450\,\mu A (\xi = 0.33)$$

When, as in the first case, the output current Iout is in the load state (heavy load state) where the output current Iout is sufficiently high as compared with the internal consumption current Icc, it is possible to ignore most of the effects of the internal consumption current Icc on the input current Iin. On the other hand, when, as in the second case, the output current Iout is in the load state (light load state) where the output current Iout is decreased to the same degree as the internal consumption current Icc, it is impossible to ignore the effects of the internal consumption current Icc on the input current Iin, and thus the decrease in the power efficiency ξ becomes obvious. Since, in a low-power consumption switching regulator, the power consumption is required to be reduced in the load state (light load state) as in the second case, it is one of important problems how the internal consumption current Icc is reduced at the time of the light load.

Another approach to reduce the input current Iin of the power supply device to realize the reduction in power consumption is to use the output voltage Vout to drive the control circuit of the power supply device. When this type of configuration is adopted, since it is possible to feed, from the side of the output, charge to the control circuit, it is possible to reduce the feeding of the charge (that is, the input current Iin) to the control circuit from the side of the input.

However, the output voltage Vout is simply fed back to the control circuit, and thus, for example, the following problems occur, with the result that it is necessary to perform further examination to realize commercialization. (1) When the power is tuned on, the output voltage Vout is 0 V, and thus since the control circuit is not started up, it is impossible to start up the output voltage Vout; (2) When, at the time of an abnormal protection operation, an operation of generating the output voltage Vout is forcibly stopped, the output voltage Vout is reduced, and thus the control circuit cannot be operated (suicide circuit); (3) Even when an unintentional variation (decrease) in the output voltage Vout is produced, the control circuit cannot be operated.

SUMMARY OF THE INVENTION

In view of the foregoing problems found by the applicant, an object of the present invention is to provide a power supply device that can realize the reduction in power consumption, and a vehicle-mounted apparatus and a vehicle using such a power supply device.

To achieve the above object, according to the present invention, there is provided a power supply device including: a control circuit that turns on and off an output transistor to generate an output voltage from an input voltage; an internal power supply voltage generation circuit that generates an internal power supply voltage from an external power supply voltage; and a power switching circuit that switches supply of the internal power supply voltage and supply of the output voltage as a drive voltage of the control circuit.

The other features, elements, steps, advantages and characteristics according to the present invention will be further obvious from the detailed description of preferred embodiments and accompanying drawings related thereto that will follow.

DETAILED DESCRIPTION OF THE PREFERRED EMBODIMENTS

<Overall Configuration>

Figure 1:
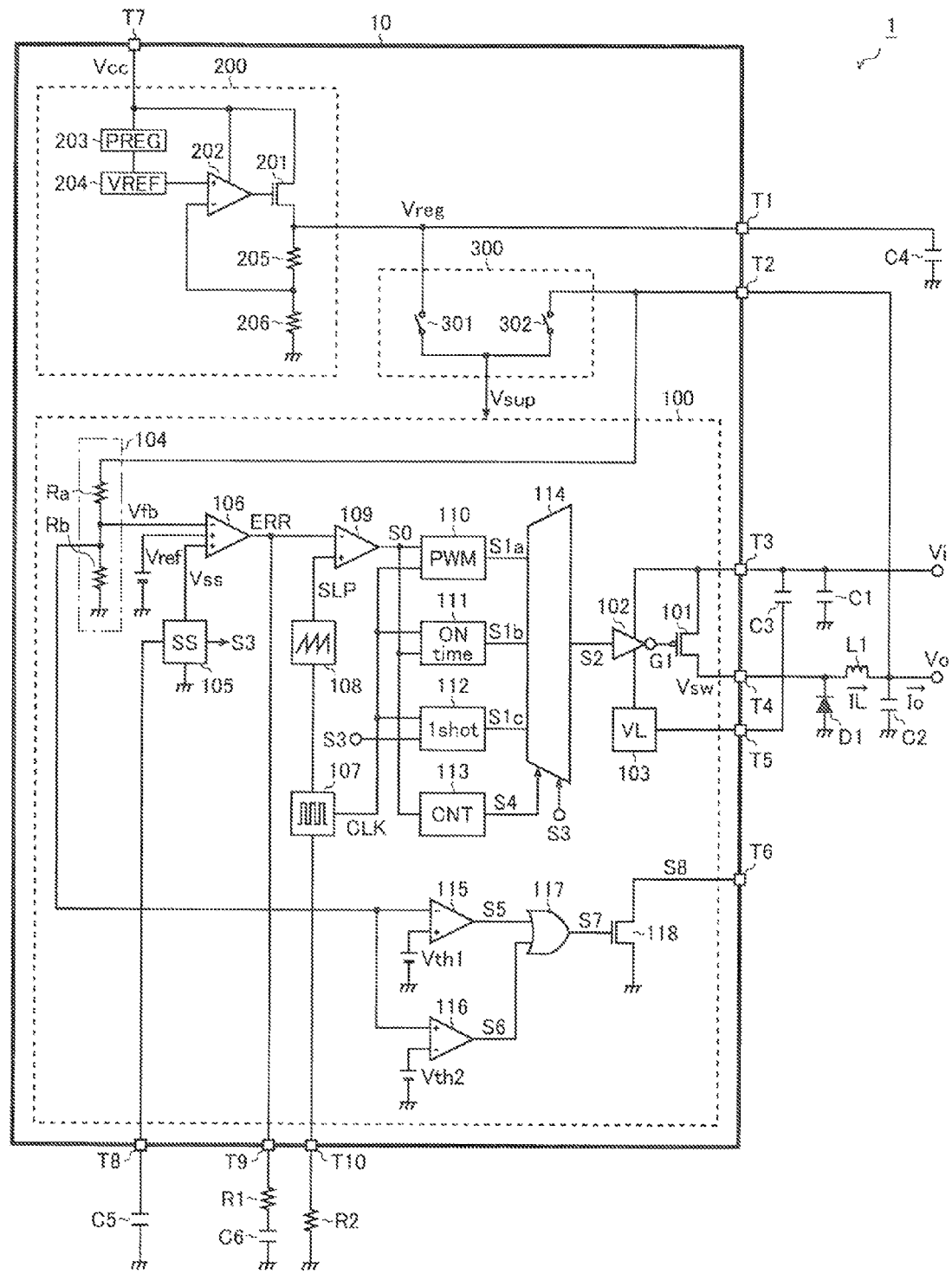
FIG. 1 A block diagram showing the overall configuration of a power supply device.

FIG. 1 is a block diagram showing the overall configuration of a power supply device. The power supply device 1 in the present configuration example is a step-down switching regulator that includes a semiconductor device 10 and various types of discrete components (a coil L1, a diode D1, resistors R1 and R2 and capacitors C1 to C6) connected externally thereto.

The semiconductor device 10 is a monolithic semiconductor integrated circuit device (for example, a vehicle-mounted power supply IC) where a switching control circuit 100, an internal power supply voltage generation circuit 200 and a power supply switching circuit 300 are integrated. The semiconductor device 10 includes external terminals T1 to T10.

Outside the semiconductor device 10, the external terminal T1 is connected through the capacitor C4 to a ground end. The external terminal T2 is connected to the application end of an output voltage Vo. Between the application end of output voltage Vo and the ground end, the capacitors C2 is connected. The external terminal T3 is connected to the application end (for example, the positive pole of a vehicle-mounted battery) of an input voltage Vi. Between the application end of the input voltage Vi and the ground end, the capacitor C1 is connected. The external terminal T4 is connected to the first terminal of the coil L1 and the cathode of the diode D1. The second terminal of the coil L1 is connected to the application end of the output voltage Vo. The anode of the diode D1 is connected to the ground end. The diode D1 can be replaced with a synchronous rectification transistor. The external terminal T5 is connected through the capacitors C3 to the application end of the input voltage Vi. The external terminal T6 is an output terminal of a power good signal S8, which will be described later. The external terminal T7 is the input terminal of an external power supply voltage Vcc (a constant voltage generated from the input voltage Vi). When the supply of the input voltage Vi is directly received as the external power supply voltage Vcc, the external terminal T7 can be omitted. The external terminal T8 is connected through the capacitor C5 to the ground end. The external terminal T9 is connected through the resistor R1 and the capacitor C6 to the ground end. The external terminal T10 is connected through the resistor R2 to the ground end.

The switching control circuit 100 is a circuit block that turns on and off an output transistor 101 to generate the output voltage Vo from the input voltage Vi, and includes the output transistor 101, a driver 102, a low-level voltage generation portion 103, a feedback voltage generation portion 104, a soft start voltage generation portion 105, an error amplifier 106, an oscillator 107, a slope voltage generation portion 108, a comparator 109, a PWM (pulse width modulation) pulse generation portion 110, an on-time fixed pulse generation portion 111, a one shot pulse generation portion 112, a selector control portion 113, a selector 114, comparators 115 and 116, an OR gate 117 and an N-channel MOS field-effect transistor 118.

The output transistor 101 is connected between the external terminal T3 and the external terminal T4, and is turned on and off to generate the output voltage Vo from the input voltage Vi. Although in the present configuration example, a P-channel MOS (metal oxide semiconductor) field-effect transistor is used as the output transistor 101, an N-channel MOS field-effect transistor may be used or may be replaced with a pnp or npn bipolar transistor.

The driver 102 generates the gate signal G1 of the output transistor 101 according to a pulse signal S2 output from the selector 114, and turns on and off the output transistor 101. The upper side power supply end of the driver 102 is connected to the external terminal T3 (the application end of the input voltage Vi). The lower side power supply end of the driver 102 is connected to the output end (the application end of a low-level voltage VL) of the low-level voltage generation portion 103. Hence, the gate signal G1 is pulse-driven between the input voltage Vi and the low-level voltage VL. In the present configuration example, as the driver 102, an inverter is used. Hence, the gate signal G1 is low when the pulse signal S2 is high whereas the gate signal G1 is high when the pulse signal S2 is low. In other words, the output transistor 101 is on when the pulse signal S2 is high whereas the output transistor 101 is off when the pulse signal S2 is low.

The low-level voltage generation portion 103 is connected between the lower side power supply end of the driver 102 and the external terminal T5, and generates the low-level voltage VL obtained by reducing the input voltage Vi by a predetermined value. The low-level voltage generation portion 103 is provided, and thus it is possible to make a drive voltage (=Vi−VL) applied between the upper side power supply end and the lower side power supply end of the driver 102 fall within an appropriate range even if the input voltage Vi is varied, with the result that the voltage resistance of the driver 102 is prevented from being unnecessarily increased.

The feedback voltage generation portion 104 includes resistors Ra and Rb connected in series between the external terminal T2 and the ground end, and outputs, from a connection node between the resistor Ra and the resistor Rb, a feedback voltage Vfb (=a division voltage of the output voltage Vo) corresponding to the output voltage Vo.

The soft start voltage generation portion 105 charges the capacitor C5 connected to the external terminal T8, and thereby generates a soft start voltage Vss that is gently increased when the electronic device 1 is started up. The soft start voltage generation portion 105 also has the function of generating a soft start completion signal S3.

The error amplifier 106 generates an error voltage ERR corresponding to a difference between which of a predetermined reference voltage Vref and the soft start voltage Vss respectively applied to the first and second non-inverting input ends (+) is lower and the feedback voltage Vfb applied to an inverting input end (−). The output end of the error amplifier 106 is connected through the external terminal T9 to the resistor R1 and the capacitor C6 for phase compensation.

The oscillator 107 generates a clock signal CLK of a predetermined frequency. The frequency of the clock signal CLK can be adjusted using the resistor R2 connected to the external terminal T10.

The slope voltage generation portion 108 generates, in synchronization with the clock signal CLK, a slope voltage SLP of a sawtooth waveform, a triangular waveform or a waveform corresponding thereto.

The comparator 109 compares the error voltage ERR applied to the inverting input end (−) and the slope voltage SLP applied to the non-inverting input end (+) to generate a comparison signal S0. The comparison signal S0 is a two-valued signal that is low when the error voltage ERR is higher than the slope voltage SLP whereas it is high when the error voltage ERR is lower than the slope voltage SLP.

The PWM pulse generation portion 110 generates a PWM pulse S1a based on the clock signal CLK and the comparison signal S0. More specifically, the PWM pulse generation portion 110 uses the rising edge of the clock signal CLK as a trigger to set the PWM pulse S1a high whereas the PWM pulse generation portion 110 uses the rising edge of the comparison signal S0 as a trigger to set the PWM pulse S1a low.

The on-time fixed pulse generation portion 111 uses the falling edge of the comparison signal S0 as a trigger to generate an on-time fixed pulse S1b in which an on-time ton and an on-time number N are constant. The operation of generating the on-time fixed pulse S1b is performed in synchronization with the clock signal CLK.

The one shot pulse generation portion 112 monitors the soft start completion signal S3, and, when the soft start voltage Vss exceeds a predetermined threshold voltage Vth4, the one shot pulse generation portion 112 generates once a one shot pulse S1c in which an on-time tfix and an on-time number M are constant. The operation of generating the one shot pulse S1c is performed in synchronization with the clock signal CLK. Although in FIG. 1, the on-time fixed pulse generation portion 111 and the one shot pulse generation portion 112 are shown as independent blocks, the one shot pulse generation portion 112 shares part or all of the on-time fixed pulse generation portion 111 and the circuit, and thus it is possible to reduce the circuit size.

The selector control portion 113 generates a selector control signal S4 so as to select any one of the PWM pulse S1a and the on-time fixed pulse S1b according to the weight of a load (the magnitude of the output current Io). More specifically, the selector control portion 113 includes a counter that measures a low level period of the comparison signal S0, and generates the selector control signal S4 so as to select any one of the PWM pulse S1a and the on-time fixed pulse S1b according to whether or not the comparison signal S0 is kept low over a predetermined mask period Tmask. In other words, the selector control portion 113 is configured to monitor the period during which the comparison signal S0 is kept low to determine the weight of the load (the magnitude of the output current Io).

Based on the soft start completion signal S3 and the selector control signal S4, the selector 114 selects, as the output signal S2, any one of the PWM pulse S1a, the on-time fixed pulse S1b and the one shot pulse S1c.

The comparator 115 compares the feedback voltage Vfb applied to the non-inverting input end (−) and a threshold voltage Vth1 (<Vref) applied to the non-inverting input end (+) to generate a short protection signal S5. The short protection signal S5 is low (a logica level at the time of a normal state) when the feedback voltage Vfb is higher than the threshold voltage Vth1 whereas the short protection signal 55 is high when the feedback voltage Vfb is lower (a logic level at the time of an abnormal state (for example, the occurrence of a ground fault) than the threshold voltage Vth1.

The comparator 116 compares the feedback voltage Vfb applied to the non-inverting input end (+) and a threshold voltage Vth2 (>Vref) applied to the non-inverting input end (−) to generate an overvoltage protection signal S6. The overvoltage protection signal S6 is low (the logic level at the time of the normal state) when the feedback voltage Vfb is lower than the threshold voltage Vth2 whereas the overvoltage protection signal S6 is high (the logic level at the time of the abnormal state (for example, the occurrence of an overvoltage) when the feedback voltage Vfb is higher than the threshold voltage Vth2.

The OR gate 117 performs a logical OR operation between the short protection signal S5 applied to a first input end and the overvoltage protection signal S6 applied to a second input end to generate an abnormal detection signal S7. The abnormal detection signal S7 is low when both the short protection signal S5 and the overvoltage protection signal S6 are low (the logic level at the time of the normal state) whereas the abnormal detection signal S7 is high (the logic level at the time of the abnormal state) when at least one of the short protection signal S5 and the overvoltage protection signal S6 is high.

The N-channel MOS field-effect transistor 118 forms an open drain output stage for outputting the power good signal S8 from the external terminal T6 to a microcomputer or the like. The drain of the transistor 118 is connected to the external terminal T6. The external terminal T6 is pulled up with an unillustrated external resistor. The source of the transistor 118 is connected to the ground end. The gate of the transistor 118 is connected to the output end of the OR gate 117. The transistor 118 is off when the abnormal detection signal S7 is low whereas the transistor 118 is on when the abnormal detection signal S7 is high. Hence, the power good signal S8 is high (the logic level at the time of the normal state) when the abnormal detection signal S7 is low whereas the power good signal S8 is low (the logic level at the time of the abnormal state) when the abnormal detection signal S7 is high.

The internal power supply voltage generation circuit 200 is a circuit block that generates an internal power supply voltage Vreg from the external power supply voltage Vcc (for example, the input voltage Vi) applied to the external terminal T7, and includes an N-channel MOS field-effect transistor 201 and an operational amplifier 202, a pre-regulator portion 203, a reference voltage generation portion 204 and resistors 205 and 206 (resistance values: R205 and R206).

The drain of the transistor 201 is connected to the external terminal T7. The source of the transistor 201 is connected to the external terminal T7, and is also connected to the ground end through the resistors 205 and 206 connected in series. The gate of the transistor 201 is connected to the output end of the operational amplifier 202. The non-inverting input end (+) of the operational amplifier 202 is connected to the output end of the reference voltage generation portion 204. The non-inverting input end (−) of the operational amplifier 202 is connected to the connection node (the application end of a division voltage Vreg') between the resistors 205 and 206. The pre-regulator portion 203 generates an internal voltage (the drive voltage of the reference voltage generation portion 204) from the external power supply voltage Vcc. The reference voltage generation portion 204 receives the internal voltage supplied from the pre-regulator portion 203 to operate, and generates a constant reference voltage VREF (for example, a band gap voltage whose temperature characteristic is flat).

In the internal power supply voltage generation circuit 200 configured as described above, the operational amplifier 202 controls the degree of conductivity of the transistor 201 such that the reference voltage VREF applied to the non-inverting input end (+) is equal to the division voltage Vreg' applied to the non-inverting input end (−). Hence, the internal power supply voltage Vreg generated in the internal power supply voltage generation circuit 200 is expressed by formula (5) below.

[Formula 5]
$$Vreg = \frac{R205 + R206}{R206} \cdot VREF \qquad (5)$$

The power supply switching circuit 300 is a circuit block that switches, as the drive voltage Vsup of the switching control circuit 100, which of the internal power supply voltage Vreg and the output voltage Vo is supplied, and includes switches 301 and 302.

The switch 301 is a switch element that performs conductivity/interruption between the application end of the internal power supply voltage Vreg and the application end of the drive voltage Vsup. As the switch 301, for example, a P-channel MOS field-effect transistor can be used.

The switch 302 is a switch element that performs conductivity/interruption between the application end of the output voltage Vo and the application end of the drive voltage Vsup. As the switch 302, for example, a P-channel MOS field-effect transistor can be used.

In the power supply device 1 configured as described above, the output transistor 101 is repeatedly turned on and off, and thus the storage and discharge of magnetic energy in the coil L1 are repeated, with the result that the output voltage Vo obtained by stepping down the input voltage Vi is generated. A switch voltage Vsw appearing at the external terminal T4 is a pulse voltage that is high (approximately the input voltage Vi) when the output transistor 101 is on whereas the switch voltage Vsw is low (approximately a ground voltage GND) when the output transistor 101 is off, and the output voltage Vo corresponds to a voltage obtained by smoothing out the switch voltage Vsw.

Although not shown in FIG. 1, in the semiconductor device 10, not only the circuit blocks described above but also various types of protection circuits (such as a thermal shut down circuit, an overcurrent protection circuit and a reduction voltage protection circuit) are integrated.

<PWM Mode (Heavy Load Mode)>

Figure 2:
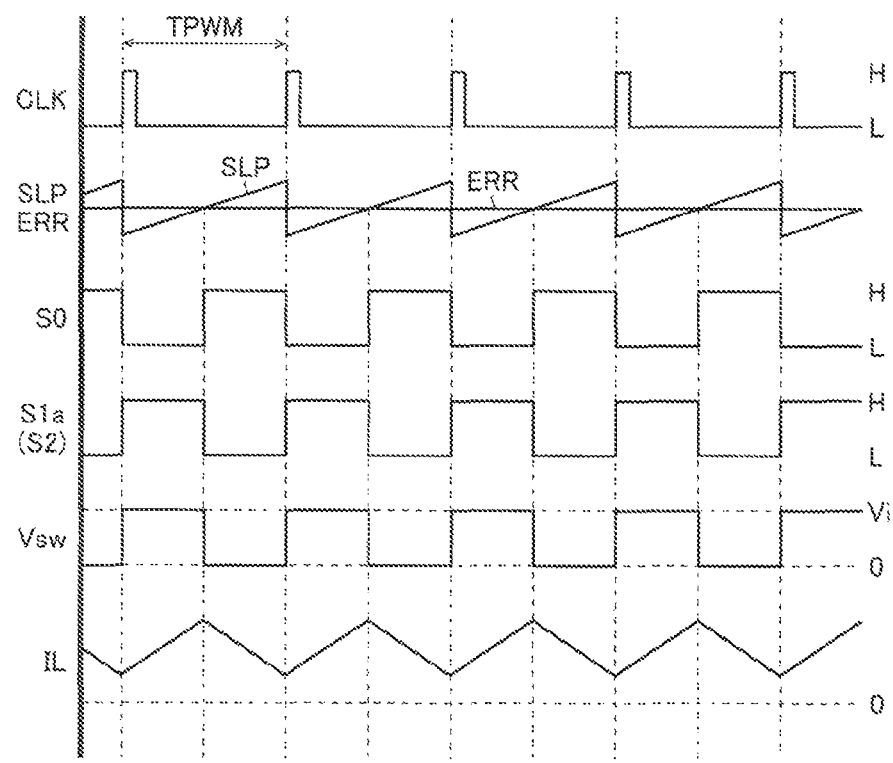
FIG. 2 A timing chart showing an operational example a disclosed implementation of a PWM mode.

FIG. 2 is a timing chart showing a disclosed implementation in a PWM mode; sequentially from above, the clock signal CLK, the slope voltage SLP, the error voltage ERR, the PWM pulse S1a (the output signal S2), the switch voltage Vsw and a coil current IL are shown.

When the load is heavy (the output current Io is high), the power supply device 1 is in the PWM mode. In the PWM mode, the PWM pulse S1a is selected as the output signal S2 of the selector 114, and the driver 102 turns on and off the output transistor 101 according to the pulse signal S2. When the output transistor 101 is in the on-period, the switch voltage Vsw is high (approximately the input voltage Vi), and the coil current IL is increased. On the other hand, when the output transistor 101 is in the off-period, the switch voltage Vsw is low (approximately the ground voltage GND), the coil current IL is reduced.

As described previously, the PWM pulse S1a uses the rising edge of the clock signal CLK as a trigger to turn high, and uses the rising edge of the comparison signal S0 as a trigger to turn low. The clock signal CLK is turned high in a constant switching period TPWM, and the comparison signal S0 is turned high when the error voltage ERR becomes lower than the slope voltage SLP. Hence, the on duty (a ratio of a period during which the PWM pulse S1a is high to the switching period TPWM) of the output transistor 101 is made shorter as the error voltage ERR is reduced whereas the on duty is made longer as the error voltage ERR is increased.

In the PWM mode in which, as described above, the turning on and off of the output transistor 101 is controlled according to the PWM pulse S1a, output feedback control is performed to make the feedback voltage Vfb equal to the reference signal Vref, and the output voltage Vo is maintained at a desired target value.

<On-Time Fixed Mode (Light Load Mode)>

Figure 3:
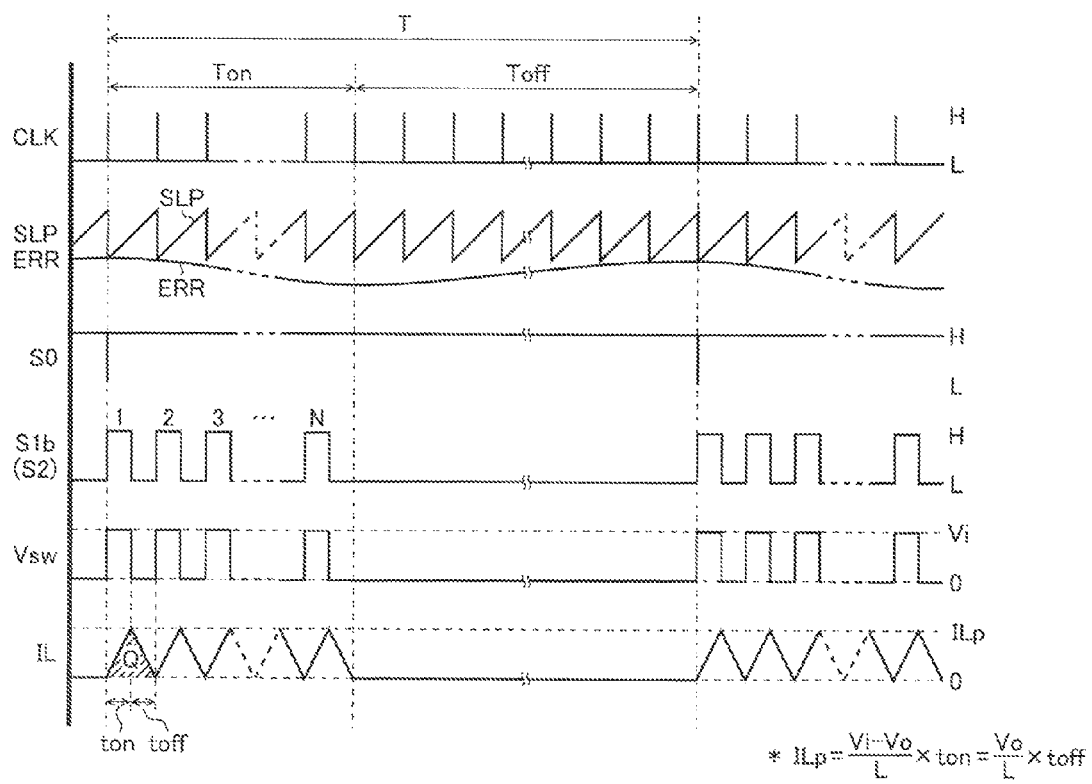
FIG. 3 A timing chart showing an operational example a disclosed implementation of an on-time fixed mode.

FIG. 3 is a timing chart showing a disclosed implementation of an on-time fixed mode; sequentially from above, the clock signal CLK, the slope voltage SLP, the error voltage ERR, the on-time fixed pulse S1b (the output signal S2), the switch voltage Vsw and the coil current IL are shown.

When the load is light (the output current Io is low), the power supply device 1 is switched from the PWM mode to the on-time fixed mode in order to reduce the internal consumption current Icc at the time of the light load. In the on-time fixed mode, the on-time fixed pulse S1b is selected as the output signal S2 of the selector 114, and the driver 102 turns on and off the output transistor 101 according to the pulse signal S2.

The on-time fixed pulse generation portion 111 generates, when the pulse edge (for example, the falling edge) of the comparison signal S0 is detected, the on-time fixed pulse S1b in which the on-time ton and the on-time number N are constant, and thereafter stops the generation of the on-time fixed pulse S1b until the pulse edge of the comparison signal S0 is subsequently detected. In other words, the on-time fixed pulse generation portion 111 generates the on-time fixed pulse S1b each time all of charge Q supplied to the coil L1 is consumed as the output current Io to the load.

As described above, in the on-time fixed mode, the switching control circuit 100 generates the on-time fixed pulse S1b to turn on and off the output transistor 101, and thereby alternately repeats an operation period Ton during which the charge is supplied to the coil L1 and a still period Toff during which the generation of the on-time fixed pulse S1b is stopped, with the result that the output voltage Vo is generated from the input voltage Vi.

When it is assumed that the current value of the internal consumption current Icc in the operation period Ton is Ion and that the current value of the internal consumption current Icc in the still period Toff is Ioff (<Ion), the average value of the internal consumption current Icc in a period T (=Ton+Toff) of the on-time fixed pulse S1b can be calculated by formula (6) below.

[Formula 6]

$$Icc = \frac{Ion \cdot Ton + Ioff \cdot Toff}{T} \quad (6)$$

When in formula (6) above, Ion, Ioff and Ton are fixed, as the ratio of the operation period Ton to the period T is decreased, the internal consumption current Icc is decreased whereas, as the ratio of the operation period Ton to the period T is increased, the internal consumption current Icc is increased.

In the on-time fixed mode, since the charge Q is supplied to the load each time the output transistor 101 is turned on, when the output transistor 101 is turned on N times, the total amount of charge supplied to the load is (N×Q).

When it is assumed that the inductance of the coil L1 is L, the on-time of the on-time fixed pulse S1b is ton and the off-time is toff, the peak value ILp of the coil current IL can be expressed by formula (7a) below. Hence, the charge Q supplied to the load each time the output transistor 101 is turned on can be calculated by formula (7b) below.

[Formula 7]

$$ILp = \frac{Vi - Vo}{L} \times ton \quad (7a)$$
$$= \frac{Vo}{L} \times toff$$

$$Q = \left(\frac{Vi - Vo}{L} \times ton\right) \cdot (ton + toff) \cdot \frac{1}{2} \quad (7b)$$
$$= \frac{Vi - Vo}{2L} \cdot \frac{Vi}{Vo} \cdot ton^2$$

As is understood from formula (7b) above, since the charge Q is proportional to the square of the on-time ton, when the on-time ton is fixed, the charge Q supplied to the load is determined and the period T is determined. In other words, between the period T and the charge Q, formula (8) below holds true.

[Formula 8]

$$N \cdot Q = Io \cdot T \Longleftrightarrow N \cdot \frac{Vi - Vo}{2L} \cdot \frac{Vi}{Vo} \cdot ton^2 = Io \cdot T \quad (8)$$

It is found from formula (8) above that, as the on-time ton or the on-time number N is set higher, the period T of the on-time fixed pulse S1b is made longer. Hence, the on-time ton or the on-time number N is set appropriate, and thus it is possible to decrease the ratio of the operation period Ton to the period T and reduce the internal consumption current Icc.

Incidentally, between the ripple component ΔVpp of the output voltage Vo and the period T of the on-time fixed pulse S1b, formula (9) below holds true.

[Formula 9]

$$\Delta Vpp = f(T) = f(ton, N, Vi) \quad (9)$$

As is understood from formula (9) above, since the ripple component ΔVpp is a function of the period T, when the period T is set longer so as to reduce the internal consumption current Icc, the ripple component ΔVpp is increased. In particular, when the input voltage Vi is high, such a relationship remarkably appears.

As described above, a relationship of trade-off holds true between the decrease in the internal consumption current Icc and the reduction in the ripple component ΔVpp; to which of them a higher priority is given cannot necessarily be determined because it differs depending on the application of the power supply device 1.

Figure 4:
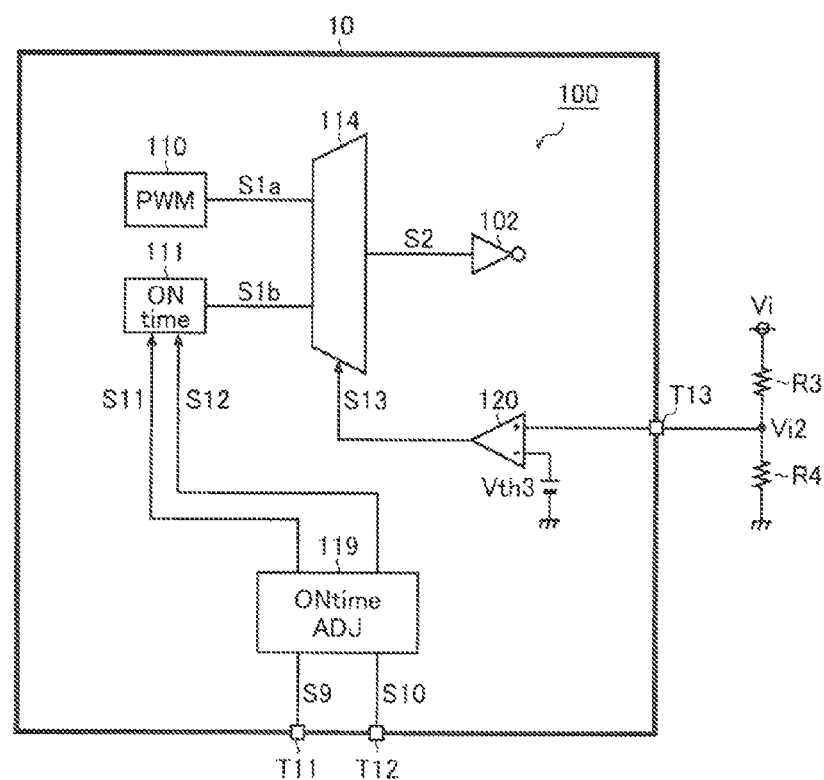
FIG. 4 A block diagram showing a configuration example of an on-time fixed pulse adjustment portion and an on-time fixed pulse cancellation portion.

Hence, in the switching control circuit 100 of the present configuration example, an adjustment means or a cancellation means of the on-time fixed pulse S1b is provided. FIG. 4 is a block diagram showing a configuration example of an on-time fixed pulse adjustment portion and an on-time fixed pulse cancellation portion.

The on-time fixed pulse adjustment portion 119 is a logic circuit that is provided in the switching control circuit 100 as a means for adjusting the on-time ton and the on-time number N of the on-time fixed pulse S1b. More specifically, according to external control signals S9 and S10 respectively input to external terminals T11 and T12 provided in the semiconductor device 10, the on-time fixed pulse adjustment portion 119 generates an on-time adjustment signal S11 and an on-time number adjustment signal S12 to feed them to the on-time fixed pulse generation portion 111.

For example, the on-time fixed pulse adjustment portion 119 generates the on-time adjustment signal S11 such that, when the external control signal S9 is high, the on-time ton is set at a first on-time ton1 whereas, when the external control signal S9 is low, the on-time ton is set at a second on-time ton2. The on-time fixed pulse adjustment portion 119 also generates the on-time number adjustment signal S12 such that, when the external control signal S10 is high, the on-time number N is set at a first on-time number N1 whereas, when the external control signal S10 is low, the on-time number N is set at a second on-time number N2.

In the power supply device 1 of the present configuration example, the external terminals T11 and T12 of the semiconductor device 10 are used, and thus it is possible to arbitrarily change the on-time ton and the on-time number N of the on-time fixed pulse S1b, with the result that it is possible to perform the optimum setting according to the application of the power supply device 1.

An on-time fixed pulse cancellation portion 120 is a comparator that compares a division voltage Vi2 (the division voltage of the input voltage Vi) applied to the non-inverting input end (+) and a threshold voltage Vth3 applied to the non-inverting input end (−) to generate an on-time fixed pulse cancellation signal S13 and that feeds it to the selector 114. The division voltage Vi2 is generated by a division voltage circuit formed with resistors R3 and R4 connected in series between the application end of the input voltage Vi and the ground end, and is applied through an external terminal T13 to the on-time fixed pulse cancellation portion 120.

The on-time fixed pulse cancellation signal S13 is low when the division voltage Vi2 is lower than the threshold voltage Vth3 whereas the on-time fixed pulse cancellation signal S13 is high when the division voltage Vi2 is higher than the threshold voltage Vth3.

When the on-time fixed pulse cancellation signal S13 is low, the selector 114 is controlled such that any one of the PWM pulse S1a and the on-time fixed pulse S1b is selected according to the selector control signal S4. On the other hand, when the on-time fixed pulse cancellation signal S13 is high, the selector 114 is controlled such that the PWM pulse S1a is selected regardless of the selector control signal S4. In other words, when the division voltage Vi2 (hence the input voltage Vi) is higher than the threshold voltage Vth3, the selector 114 is controlled such that the PWM pulse S1a is selected regardless of the weight of the load.

In the power supply device 1 of the present configuration example, it can be realized that, for example, when the input voltage Vi is lower than a predetermined value at the time of the light load, a higher propriety is given to the decrease in the internal consumption current Icc whereas, when the input voltage Vi is higher than the predetermined value at the time of the light load, a higher propriety is given to the reduction in the ripple component ΔVpp.

It is possible to arbitrarily adjust, with the resistors R3 and R4, an input voltage level at which the validity/cancellation of the on-time fixed pulse S1b is switched.

<Power Switching Circuit>

Figure 5:
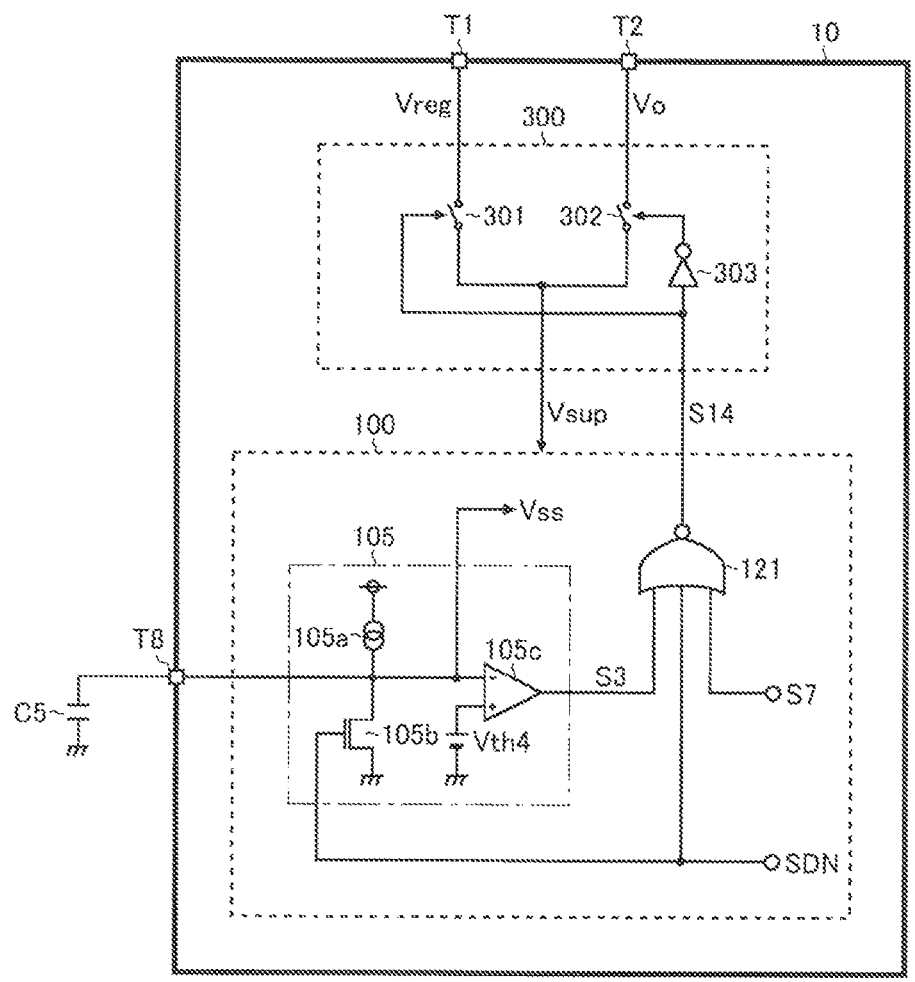
FIG. 5 A block diagram showing a configuration example of a power switching circuit.

FIG. 5 is a block diagram showing a configuration example of a power switching circuit 300. The power switching circuit 300 of the present configuration example includes not only the switches 301 and 302 described above but also an inverter 303. A switching control signal S14 that is input from the switching control circuit 100 to the power switching circuit 300 is directly input to the control end of the switch 301, and is also inverted and input through the inverter 303 to the control end of the switch 302. When the switching control signal S14 is low, the switch 301 is on and the switch 302 is off. Hence, the power switching circuit 300 is in a state where the internal power supply voltage Vreg is selected as the drive voltage Vsup of the switching control circuit 100. On the other hand, when the switching control signal S14 is high, the switch 301 is off, and the switch 302 is on. Hence, the power switching circuit 300 is in a state where the output voltage Vo is selected as the drive voltage Vsup if the switching control circuit 100.

The switching control circuit 100 includes a NOR gate 121 as a means for generating the switching control signal S14. The NOR gate 121 performs a NOR operation on the soft start completion signal S3, the logical OR signal (abnormal detection signal) S7 and a forcible stop signal SDN (such as a thermal shut down signal) of the power supply device 1, and thereby generates the switching control signal S14. Hence, the switching control signal S14 is low when at least one of three input signals is high whereas the switching control signal S14 is low only when all of three input signals are high.

The soft start completion signal S3 is generated in the soft start voltage generation portion 105. The soft start voltage generation portion 105 includes a current source 105a, an N-channel MOS field-effect transistor 105b and a comparator 105c. The current source 105a is connected between the power supply end and the external terminal T8, and generates a charging current for the capacitor C5 externally connected to the external terminal T8. The transistor 105b is connected between the external terminal T8 and the ground end, is turned on when the forcible stop signal SDN is turned high (a logic level at the time of the forcible stop) to charge the soft start voltage Vss (the charging voltage of the capacitor C5). The comparator 105c compares the soft start voltage Vss applied to the non-inverting input end (−) and the threshold voltage Vth4 applied to the non-inverting input end (+) to generate the soft start completion signal S3. The soft start completion signal S3 is high when the soft start voltage Vss is lower than the threshold voltage Vth4 (when the soft start operation is not completed) whereas the soft start completion signal S3 is low when the soft start voltage Vss is higher than the threshold voltage Vth4 (when the soft start operation is completed).

The abnormal detection signal S7 is generated by a logical OR operation between the short protection signal S5 and the overvoltage protection signal S6. Hence, the abnormal detection signal S7 is high when at least one of two input signals is high (the logic level at the time of the abnormal state) whereas the abnormal detection signal S7 is low only when both of two input signals are low (the logic level at the time of the normal state).

The forcible stop signal SDN is turned high when the power supply device 1 is brought into the state where power supply device 1 is forcibly stopped, and is turned low when the forcible stop state of the power supply device 1 is cancelled.

Hence, the switching control signal S14 is turned high only when the soft start operation is completed (S3=L), the abnormality of the semiconductor device 10 is not detected (S7=L) and the forcible stop state of the power supply device 1 is cancelled (SDN=L) whereas the switching control signal S14 is turned low when the remaining conditions are satisfied.

In other words, in the power switching circuit 300, the power switching control is performed based on the results of monitoring of whether or not the soft start voltage Vss is higher than the predetermined threshold voltage Vth4, whether or not the feedback voltage Vfb (hence the output voltage Vo) falls within a normal range (Vth 1<Vfb<Vth2) and whether or not the forcible stop state of the power supply device 1 is cancelled.

More specifically, the power switching circuit 300 selects the output voltage Vo as the drive voltage Vsup of the switching control circuit 100 only when the soft start operation is completed (S3=L), the abnormality of the semiconductor device 10 is not detected (S7=L) and the forcible stop state of the power supply device 1 is cancelled (SDN=L) whereas the power switching circuit 300 selects the internal power supply voltage Vreg as the drive voltage Vsup of the switching control circuit 100 when the remaining conditions are satisfied.

Figure 6:
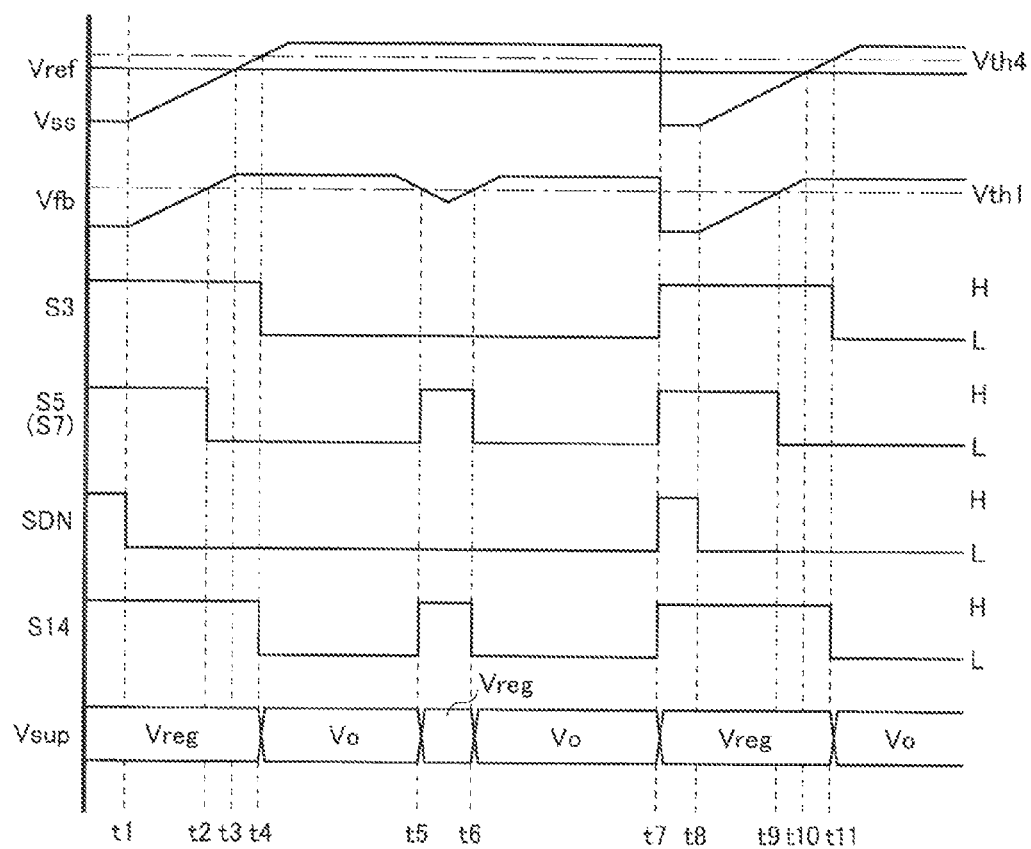
FIG. 6 A timing chart showing an example of a power switching operation.

FIG. 6 is a timing chart showing an example of a power switching operation; sequentially from above, the reference signal Vref, the soft start voltage Vss, the output voltage Vo, the soft start completion signal S3, the abnormal detection signal S7, the forcible stop signal SDN, the switching control signal S14 and the drive voltage Vsup are shown. Time shown on the horizontal axis of FIG. 6 is assumed to proceed from times t1 to t11.

As shown in FIG. 6, when the power supply device 1 is started up, until the soft start voltage Vss is increased to the threshold voltage Vth4, the internal power supply voltage Vreg is supplied as the drive voltage Vsup of the switching control circuit 100 (see the times t1 to t4). The power switching control described above is performed, and thus it is possible to raise the output voltage Vo without any problem when the power supply device 1 is started up.

Thereafter, when the soft start voltage Vss exceeds the threshold voltage Vth4, the output voltage Vo is supplied as the drive voltage Vsup of the switching control circuit 100 (see times t4 to t5 and times t6 to t7). The power switching control described above is performed, and thus it is possible to supply charge from the output side to the switching control circuit 100, with the result that it is possible to reduce the supply of the charge (that is, the input current) to the switching control circuit 100.

However, even after the completion of the soft start operation, when the output voltage Vo fails to fall within the normal range (see the times t5 to t6) or when the power supply device 1 is brought to the forcible stop state (see the times t7 to t8), the internal power supply voltage Vreg is supplied as the drive voltage Vsup of the switching control circuit 100 as it is done when the power supply device 1 is started up. The power switching control described above is performed, and thus it is possible to acquire the drive voltage Vsup of the switching control circuit 100 such that, when the output voltage Vo is varied or when the power supply device 1 is forcibly stopped, the malfunction of the switching control circuit 100 is prevented.

As described above, in the power supply device 1 of the present configuration example, the charge is supplied from the output side of the switching control circuit 100 only when the output voltage Vo is stable. For example, since in the vehicle-mounted power supply device 1, it is required to reduce the power consumption at the time of the normal operation, it is possible to satisfy the requirement with the power switching sequence described above.

Since the switching control signal S14 is generated from the internal signals (the soft start completion signal S3, the abnormal detection signal S7 and the forcible stop signal SDN) present in the power supply device 1, the circuit size is prevented from being unnecessarily increased.

The technical idea on the feeding back of the output voltage Vo is not limited to the switching regulator; it can be applied to the power supply device of any system, Mode Switching Operation>

Figure 7:
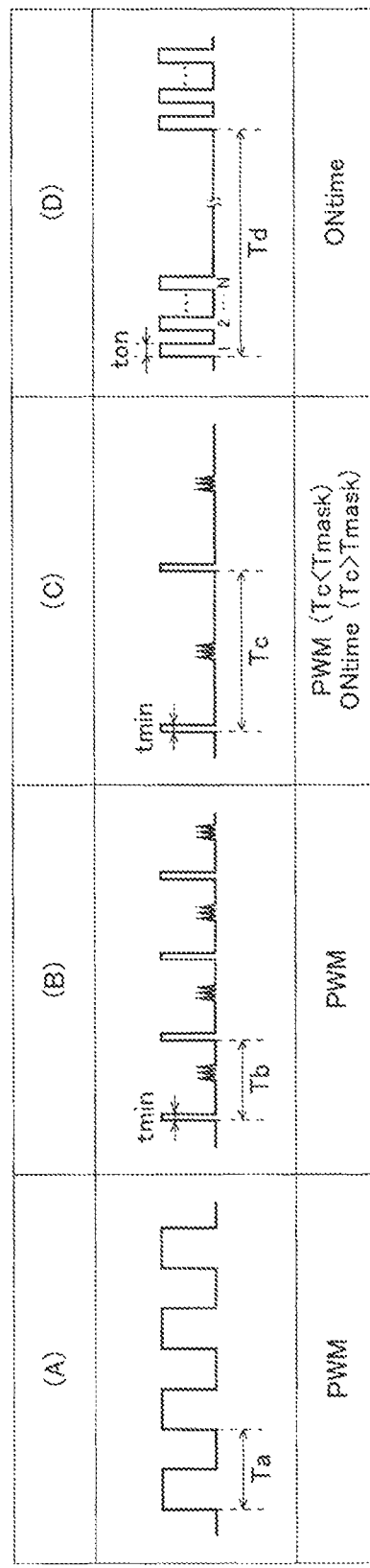
FIG. 7 A diagram showing how the behavior of a switch voltage is changed according to a load.

FIG. 7 shows how the behavior of the switch voltage Vsw is changed according to the load; the load is assumed to be decreased as the diagram proceeds from left to right.

In a state (when the power supply device 1 is started up or in a heavy load state) where the power supply device 1 is driven in the PWM mode, as the load is reduced, in general, the behavior of the switch voltage Vsw is first switched from a continuous mode (A) to a discontinuous mode (B). However, both a switching period Ta in the continuous mode (A) and a period Tb in the discontinuous mode (B) are maintained as the switching period TPWM (=the period of the clock signal CLK) that is determined within the semiconductor device 10.

As the load is further reduced, lack of the PWM pulse S1a occurs, and thus it is impossible to maintain the switching period TPWM, with the result that the behavior of the switch voltage Vsw is brought to an intermittent oscillation mode (C) (Tc>TPWM). Here, the operational mode of the power supply device 1 is switched from the PWM mode to the on-time fixed mode (D) according to a load determination operation, which will be described later.

As described previously, since a switching period Td (corresponding to the period T in FIG. 3) in the on-time fixed mode is designed to be sufficiently greater than the switching period TPWM in the PWM mode at the time of the light load, after the generation of N pulses, an operation of generating the on-time fixed pulse S1b is stopped over at least one switching period TPWM. As described above, the major characteristic of the on-time fixed mode lies in that the operation period Ton during which the on-time fixed pulse S1b is generated and the still period Toff during which the generation of the on-time fixed pulse S1b is stopped are alternately repeated, and thus the internal consumption current Icc (the average value) per period is reduced to improve power efficiency $\xi$ at the time of the light load.

When it is assumed that the charge supplied to the load each time the transistor 101 is turned on in the PWM mode is Q1, and that the minimum on-time (the minimum pulse width) of the PWM pulse S1a is tmin, a threshold current Ith1 when the PWM mode is switched to the on-time fixed mode can generally be determined from formula (10) below.

[Formula 10]

$$Q1 = Ith1 \cdot TPWM, Q1 = f(tmin) \tag{10}$$

The switching of the on-time fixed mode to the PWM mode can likewise be understood. When it is assumed that the charge supplied to the load each time the output transistor 101 is turned on N times in on-time fixed mode is Q2, and that the on-period of the on-time fixed pulse S1b per pulse is ton, a threshold current Ith2 when the on-time fixed mode is switched to the PWM mode can generally be determined from formula (11) below.

[Formula 11]

$$Q2 = Ith2 \cdot Td, Q2 = f(N \cdot ton) \tag{11}$$

The switching load points (Ith1 and Ith2) described above are significantly important. Since in the on-time fixed mode, the on-time ton and the on-time number N are fixed, the threshold current Ith2 is easily designed, and the power efficiency $\xi$ is easily adjusted at the time of a significantly light load.

However, when the on-time ton and the on-time number N are set great so that the power efficiency $\xi$ is enhanced at the time of the light load, the threshold current Ith2 when the light load is switched to the heavy load is increased, and thus the operation is disadvantageously performed in the on-time fixed mode even over a region where the operation is originally intended to be performed in the PWM mode. In the following description, principles of the occurrence of such a problem will be discussed in further detail.

As shown in FIG. 3 described previously, in the on-time fixed mode, the on-time fixed pulse S1b in which the on-time ton is fixed is used to turn on and off the output transistor 101, and thus the charge is supplied to the load. As indicated in formula (7) described previously, in the on-time fixed mode, the charge Q supplied to the load each time the output transistor 101 is turned on is a function of the input voltage Vi, the output voltage Vo and the on-time ton.

When only N on-time fixed pulses S1b are generated, the total amount of charge fed to the load is (N×Q), and this charge is consumed as the output current Io flowing through the load over the period T. In view of the forgoing fact, the switching period T in the on-time fixed mode can be calculated by formula (12) below.

[Formula 12]

$$T = \frac{N \cdot Q}{Io} \tag{12}$$

Here, if the on-time fixed mode is not switched to the PWM mode as long as the switching period T in the on-time fixed mode is decreased so as to be equal to the switching period TPWM in the PWM mode, the threshold current Ith2 when the on-time fixed mode is switched to the PWM mode can be determined from formula (13)

[Formula 13]

$$Ith2 = \frac{N \cdot Q}{TPWM} \quad (13)$$

For example, when Vi=12 V, Vo=5 V, ton=600 ns, N=4, L=10 μH and f=500 kHz (TPWM=2 μs), the output current Io that is the boundary between the continuous mode (A) and the discontinuous mode (B) is about 210 mA whereas the threshold current Ith2 is about 600 mA. In other words, even in a load region where the operation in the PWM mode can be sufficiently performed, the operation in the on-time fixed mode is continued.

Hence, in the power supply device 1 of the present configuration example, when the switching period T in the on-time fixed mode becomes equal to the predetermined mask period Tmask (>TPWM), the on-time fixed mode is switched to the PWM mode.

More specifically, in order to realize the mode switching operation described above, when the low-level period of the comparison signal S0 is shorter than the mask period Tmask, the selector control portion 113 generates the selector control signal S4 such that the PWM pulse S1a is selected whereas, when the low-level period of the comparison signal S0 is longer than the mask period Tmask, the selector control portion 113 generates the pulse signal S2 such that the on-time fixed pulse S1b is selected.

When this type of configuration is adopted, the threshold current Ith2 when the on-time fixed mode is switched to the PWM mode can be determine from formula (14) below.

[Formula 14]

$$Ith2 = \frac{N \cdot Q}{Tmask} \quad (14)$$

For example, when Vi=12 V, Vo=5 V, ton=600 ns, N=4, L=10 μH and Tmask=32 μs, the threshold current Ith2 is about 37 mA. As described above, in the power supply device 1 of the present configuration example, even when the on-time ton and the on-time number N are set great such that the power efficiency ξ is enhanced at the time of the light load, since it is possible to shift the threshold current Ith2 to the side of the light load, it is possible to appropriately perform the switching from the on-time fixed mode to the PWM mode without any delay.

In the power supply device 1 of the present configuration example, since the PWM mode is not switched to the on-time fixed mode as long as the low-level period of the comparison signal S0 is not continued over the mask period Tmask, it is also possible to prevent the unintentional switching of the operational mode when the load is varied or when noises are superimposed.

<Counter Adjustment Portion>

Figure 8:
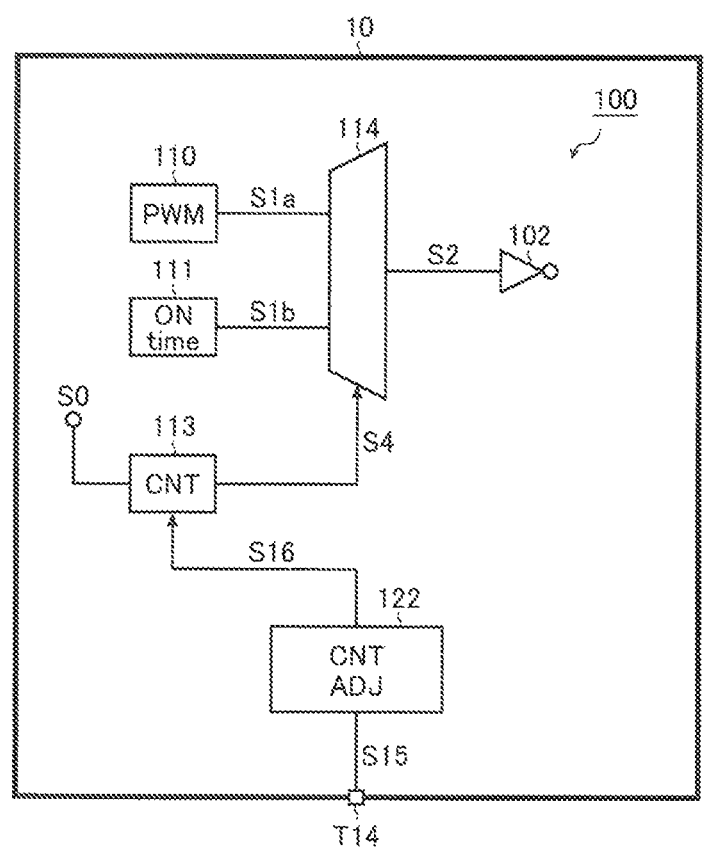
FIG. 8 A block diagram showing a configuration example of a counter adjustment portion.

Incidentally, since the load varying time and the noise superimposing time differ depending on the application of the power supply device 1 and the load, the mask period Tmask cannot necessarily be determined. Hence, in the switching control circuit 100 of the present configuration example, a counter adjustment portion is provided. FIG. 8 is a block diagram showing a configuration example of the counter adjustment portion.

The counter adjustment portion 122 is a logic circuit that is provided in the switching control circuit 100 as a means for adjusting the mask period Tmask. Specifically, the counter adjustment portion 122 generates a mask period adjustment signal S16 according to an external control signal S15 input to an external terminal T14 provided in the semiconductor device 10, and feeds out it to the selector control portion 113.

For example, the counter adjustment portion 122 generates the mask period adjustment signal S16 such that the counter adjustment portion 122 sets the mask period Tmask at a first mask period Tmask1 when the external control signal S15 is high whereas the counter adjustment portion 122 sets the mask period Tmask at a second mask period Tmask2 when the external control signal S15 is low.

In the power supply device 1 of the present configuration example, the external terminal T14 of the semiconductor device 10 is used, and thus it is possible to arbitrarily change the mask period Tmask, with the result that it is possible to appropriately set the mask period Tmask according to the application of the power supply device 1 and the load. If the function of adjusting the mask period Tmask is used, it is also possible to arbitrarily adjust the threshold currents Ith1 and the Ith2 that are the points where the PWM mode and the on-time fixed mode are switched.

<One Shot Mode>

As shown in FIG. 7 described previously, in a state (when the power supply device 1 is started up or the heavy load state) where the power supply device 1 is operated in the PWM mode, as the load is reduced, the behavior of the switch voltage Vsw is brought from the continuous mode (A) to the discontinuous mode (B). Here, the on-time (pulse width) of the PWM pulse S1a is the minimum on-time (the minimum pulse width) tmin determined within the semiconductor device 10.

As the load is further reduced, the behavior of the switch voltage Vsw is brought into the intermittent oscillation mode (C), and, when the high-level period of the comparison signal S0 is maintained over the predetermined mask period Tmask, the mode is brought into the on-time fixed mode (D).

Specifically, the threshold current Ith1 when the PWM mode is switched to the on-time fixed mode can be determined from formula (15) below according to the minimum on-time tmin and the mask period Tmask of the PWM pulse S1a.

[Formula 15]

$$ITH1 = \frac{Q}{Tmask}, \quad (15)$$
$$Q = f(tmin)$$

As is understood from formula (15), as the minimum on-time tmin of the PWM pulse S1a is set lower, the charge Q supplied to the load each time the output transistor 101 is turned on is reduced, and hence, since the threshold current Ith1 is further shifted to the side of the light load, switching timing at which the PWM mode is switched to the on-time fixed mode is delayed, with the result that it becomes impossible to enhance the power efficiency ξ at the time of the light load. In particular, in the power supply device 1 of the present configuration example, since in the selector control portion 113, the mask period Tmask longer than the switching frequency TPWM of the PWM pulse S1a is set, the threshold current Ith1 is more significantly shifted to the side of the light load.

However, in order to make the soft start operation effectively function when the power supply device 1 is started up, it is necessary to set the minimum on-time tmin of the PWM pulse S1a sufficiently low. If it is set unnecessarily high, this results in overshoot or the like.

Hence, the power supply device 1 of the present configuration example includes: a one shot pulse generation portion 112 that generates only once a one shot pulse S1c where the on-time tfix (>tmin) and the on-time number M are constant when the soft start voltage Vss exceeds the predetermined threshold voltage Vth4; and the selector 114 that selects a one shot pulse Ic regardless of the selector control signal S4 when the soft start voltage Vss exceeds the threshold voltage Vth4.

Figure 9:
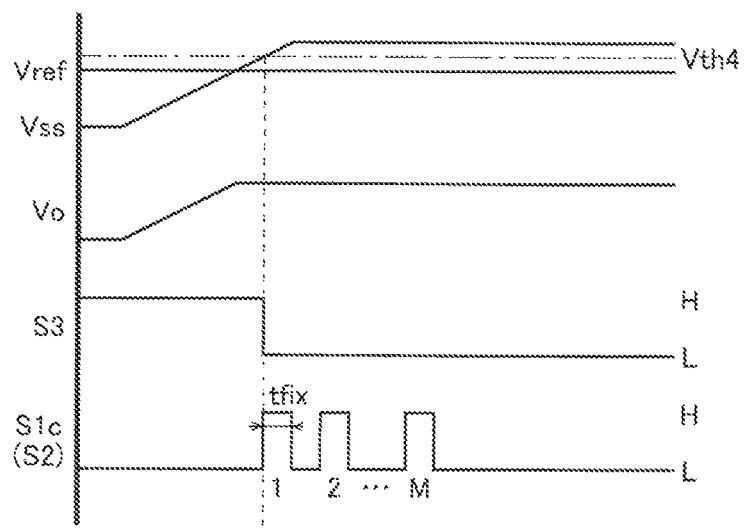
FIG. 9 A timing chart showing an example of a one shot pulse generation operation.

FIG. 9 is a timing chart showing an example of a one shot pulse generation operation; sequentially from above, the reference signal Vref, the soft start voltage Vss, the output voltage Vo, the soft start completion signal S3 and the one shot pulse S1c (the output signal S2) are shown.

As shown in FIG. 9, when the power supply device 1 is started up, the soft start voltage Vss is started to be gently increased, and the output voltage Vo is increased accordingly. Here, although the power supply device 1 is operated in the PWM mode, the minimum on-time tmin of the PWM pulse S1a (not shown in FIG. 9) is set sufficiently low, with the result that it is possible to make the soft start operation effectively function to reduce overshoot or the like.

Thereafter, when the soft start voltage Vss exceeds the threshold voltage Vth4, the soft start completion signal S3 is turned low. The soft start completion signal S3 is an existing signal for masking (enabling) various internal signals when the power supply device 1 is started up.

The one shot pulse generation portion 112 monitors the soft start completion signal S3 described above, and uses the falling edge of the soft start completion signal S3 as a trigger to generate the one shot pulse S1c where the on-time tfix and the on-time number M are constant. The on-time tfix and the on-time number M of the one shot pulse S1c may be the same setting values as the on-time ton and the on-time number N of the on-time fixed pulse S1b or may be different setting values.

The selector 114 also monitors the soft start completion signal S3 described above, and selects the one shot pulse S1c regardless of the selector control signal S4 when the soft start voltage Vss exceeds the threshold voltage Vth4.

Consequently, when the power supply device 1 is started up, the turning on and off of the output transistor 101 is controlled by the one shot pulse S1c once after the completion of the soft start operation. Here, the threshold current Ith1' when the PWM mode is switched to the on-time fixed mode can be determined from formula (16) below according to the on-time tfix and the on-time number M of the one shot pulse S1c and the mask period Tmask.

[Formula 16]

$$ITH1' = \frac{Q'}{Tmask}, \quad (16)$$
$$Q' = f(M \cdot tfix)$$

As is understood from formula (16) above, in the one shot mode, the on-time tfix and the on-time number M of the one shot pulse S1c are approximately set, and thus it is possible to increase the charge Q' supplied to the load as compared with the PWM mode during the soft start operation, with the result that it is possible to shift the threshold current Ith1' when the PWM mode is switched to the on-time fixed mode to the side of the heavy load.

For example, when Vi=12 V, Vo=5 V, L=10 μH, tmin=150 ns and Tmask=50 μs, the threshold current Ith1 is about 330 μA. On the other hand, when the one shot pulse S1c where tfix=400 ns and M=2 is generated under the same conditions as described above, the threshold current Ith1' is about 5 mA. As described above, in the power supply device 1 of the present configuration example, the switching timing at which the PWM mode is switched to the on-time fixed mode is set ahead, and thus it is possible to enhance the power efficiency ξ at the time of the light load.

<Vehicle>

Figure 10:
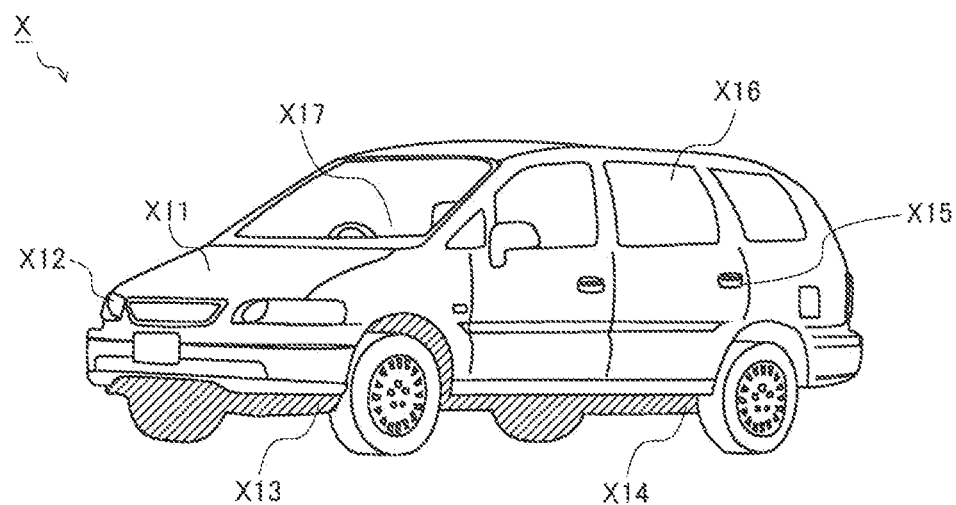
FIG. 10 An appearance diagram showing a configuration example of a vehicle that incorporates a vehicle-mounted apparatus.

FIG. 10 is an appearance diagram showing a configuration example of a vehicle that incorporates a vehicle-mounted apparatus. The vehicle X of the present configuration example includes vehicle-mounted apparatuses X11 to X17 and a battery (not shown) that supplies power to the vehicle-mounted apparatuses X11 to X17.

The vehicle-mounted apparatus X11 is an engine control unit that performs control related to an engine (such as injection control, electronic throttle control, aiding control, oxygen sensor heater control and auto cruise control).

The vehicle-mounted apparatus X12 is a lamp control unit that controls the turning on and off of a HID (high intensity discharged lamp), a DRL (daytime running lamp) and the like.

The vehicle-mounted apparatus X13 is a transmission control unit that performs control related to a transmission.

The vehicle-mounted apparatus X14 is a body control unit that performs control related to the movement of the vehicle X (such as ABS (anti-lock brake system) control, EPS (electric power steering) control and electronic suspension control).

The vehicle-mounted apparatus X15 is a security control unit that performs drive control on a door lock, a burglar alarm and the like.

The vehicle-mounted apparatus X16 is an electronic apparatus that is incorporated in the vehicle X at the stage of factory shipment, as a standard accessory and a maker option such as a wiper, an electrically operated door mirror, a powered window, an electrically operated sunroof, an electrically operated sheet and an air-conditioner.

The vehicle-mounted apparatus X17 is an electronic apparatus with which the vehicle X is arbitrarily equipped by a user, such as a vehicle-mounted A/V (audio/visual) apparatus, a car navigation system and an ETC (electronic toll collection system).

The power supply device 1 described previously can be incorporated in any of the vehicle-mounted apparatuses X11 to X17.

<Outline>

In the following description, the outline of the power supply devices having the various technical features disclosed in the present specification will be discussed.

[First Technical Feature]

Among the various power supply devices disclosed in the present specification, the power supply device having a first technical feature includes the control circuit that generates the on-time fixed pulse where the on-time and the on-time number are constant to turn on and off the output transistor, and thereby alternately repeats the operation period during which the charge is supplied to the coil and the still period during which the generation of the on-time fixed pulse is stopped, with the result that the output voltage is generated from the input voltage (1-1 configuration).

Preferably, in the power supply device of the 1-1 configuration, the control circuit includes the on-time fixed pulse generation portion that generates the on-time fixed pulse each time all of charge supplied to the coil is consumed as the output current to the load (1-2 configuration).

Preferably, in the power supply device of the 1-2 configuration, the control circuit includes the on-time fixed pulse adjustment portion that adjusts at least one of the on-time and the on-time number of the on-time fixed pulse (1-3 configuration).

Preferably, in the power supply device of the 1-3 configuration, the on-time fixed pulse adjustment portion generates the on-time adjustment signal and the on-time number adjustment signal according to the external control signals input to the external terminals (1-4 configuration).

Preferably, in the power supply device of any one of the 1-2 to 1-4 configurations, the control circuit includes: the PWM pulse generation portion that generates the PWM pulse according to the output feedback control; the selector that selects any one of the on-time fixed pulse and the PWM pulse according to the weight of the load; and the drive that turns on and off the output transistor according to the output of the selector (1-5 configuration).

Preferably, in the power supply device of the 1-5 configuration, the control circuit includes: the feedback voltage generation portion that generates the feedback voltage corresponding to the output voltage; the error amplifier that generates the error voltage corresponding to the difference between the predetermined reference voltage and the feedback voltage; and the comparator that generates the comparison signal corresponding to the result of the comparison between the predetermined slope voltage and the error voltage to output it to the PWM pulse generation portion (1-6 configuration).

Preferably, in the power supply device of the 1-6 configuration, the on-time fixed pulse generation portion generates, when the pulse edge of the comparison signal is detected, the on-time fixed pulse and thereafter stops the generation of the on-time fixed pulse until the pulse edge of the comparison signal is subsequently detected (1-7 configuration).

Preferably, in the power supply device of any one of the 1-5 to 1-7 configurations, the control circuit includes the on-time fixed pulse cancellation portion that controls, when the input voltage is higher than the predetermined threshold voltage, the selector such that the PWM pulse is selected regardless of the weight of the load (1-8 configuration).

Preferably, in the power supply device of the 1-8 configuration, the on-time fixed pulse cancellation portion controls, when the input voltage is lower than the threshold voltage, the selector such that any one of the PWM pulse and the on-time fixed pulse is selected (1-9 configuration).

The vehicle-mounted apparatus disclosed in the present specification includes the power supply device of any one of the 1-1 to 1-9 configurations (1-10 configuration).

The vehicle disclosed in the present specification includes the vehicle-mounted apparatus of the 1-10 configuration and the battery that supplies power to the vehicle-mounted apparatus (1-11 configuration).

[Second Technical Feature]

Among the various power supply devices disclosed in the present specification, the power supply device having a second technical feature includes: a control circuit that turns on and off an output transistor to generate an output voltage from an input voltage; an internal power supply voltage generation circuit that generates an internal power supply voltage from an external power supply voltage; and a power switching circuit that switches supply of the internal power supply voltage and supply of the output voltage as a drive voltage of the control circuit (2-1 configuration).

Preferably, in the power supply device of the 2-1 configuration, the control circuit includes a soft start voltage generation portion that generates a soft start voltage which starts to gently increase after the power supply device is started up, and the power switching circuit performs power switching control according to whether or not the soft start voltage exceeds a predetermined threshold voltage (2-2 configuration).

Preferably, in the power supply device of the 2-1 or 2-2 configuration, the power switching circuit performs power switching control according to whether or not the output voltage or a feedback voltage corresponding to the output voltage falls within a normal range (2-3 configuration).

Preferably, in the power supply device of any one of the 2-1 to 2-3 configurations, the power switching circuit performs power switching control according to whether or not a state where the power supply device is forcibly stopped is cancelled (2-4 configuration).

Preferably, in the power supply device of the 2-2 configuration, the soft start voltage generation portion uses a current source and a transistor connected in series to the current source and thereby performs charge and discharge control on a capacitor connected to a connection node between the current source and the transistor so as to control the soft start voltage (2-5 configuration).

Preferably, in the power supply device of the 2-5 configuration, the soft start voltage generation portion turns on the transistor to discharge the soft start voltage when a forcible stop signal of the power supply device is input, and the power switching circuit performs, when the forcible stop signal is input, power switching such that the internal power supply voltage is supplied as the drive voltage of the control circuit (2-6 configuration).

Preferably, in the power supply device of the 2-6 configuration, the control circuit includes a logical operation circuit to which a soft start completion signal, the forcible stop signal and an abnormal detection signal are input, and the power switching circuit performs, based on an output of the logical operation circuit, when soft start is completed, forcible stop is cancelled and abnormality is not detected, power switching such that the output voltage is supplied as the drive voltage of the control circuit (2-7 configuration).

Preferably, in the power supply device of the 2-2 configuration, when the power supply device is started up, until the soft start voltage is increased to the threshold voltage, the power switching circuit performs power switching such that the internal power supply voltage is supplied as the drive voltage of the control circuit (2-8 configuration).

Preferably, in the power supply device of any one of the 2-1 to 2-8 configurations, the internal power supply voltage generation circuit includes: a pre-regulator circuit that generates an internal voltage from the external power supply voltage; and a reference voltage generation portion that receives the internal voltage generated by the pre-regulator circuit to generate a constant reference voltage used for the generation of the internal power supply voltage (2-9 configuration).

The vehicle-mounted apparatus disclosed in the present specification includes the power supply device of any one of the 2-1 to 2-9 configurations (2-10 configuration).

The vehicle disclosed in the present specification includes the vehicle-mounted apparatus of the 2-10 configuration and the battery that supplies power to the vehicle-mounted apparatus (2-11 configuration).

[Third Technical Feature]

Among the various power supply devices disclosed in the present specification, the power supply device having a third technical feature includes: an output transistor that is turned on and off to generate an output voltage from an input voltage; a feedback voltage generation portion that generates a feedback voltage corresponding to the out voltage; a soft start voltage generation portion that generates a soft start voltage which gently increases when the power supply device is started up; an error amplifier that generates an error voltage corresponding to a difference between which of a predetermined reference voltage and the soft start voltage is lower and the feedback voltage; an oscillator that generates a clock signal of a predetermined frequency; a slope voltage generation portion that generates a slope voltage in synchronization with the clock signal; a comparator that compares the error voltage and the slope voltage to generate a comparison signal; a PWM pulse generation portion that generates a PWM pulse based on the clock signal and the comparison signal; an on-time fixed pulse generation portion that uses the comparison signal as a trigger to generate an on-time fixed pulse where an on-time and an on-time number are constant; a one shot pulse generation portion that generates once, when the soft start voltage exceeds a predetermined threshold voltage, a one shot pulse where the on-time and the on-time number are constant; a selector that selects any one of the PWM pulse, the on-time fixed pulse and the one shot pulse; and a driver that turns on and off the output transistor according to an output of the selector (3-1 configuration).

Preferably, the power supply device of the 3-1 configuration further includes a selector control portion that generates a selector control signal such that any one of the PWM pulse and the on-time fixed pulse is selected according to the weight of a load (3-2 configuration).

Preferably, in the power supply device of the 3-2 configuration, the selector selects the one shot pulse regardless of the selector control signal when the soft start voltage exceeds the threshold voltage (3-3 configuration).

Preferably, in the power supply device of the 3-3 configuration, the selector control portion monitors a period during which the comparison signal is kept at the same logic level to determine the weight of the load (3-4 configuration).

Preferably, in the power supply device of the 3-2 configuration, when the load is reduced in a PWM mode where the PWM pulse is selected by the selector and a switch voltage appearing at one end of the output transistor is brought from a continuous mode to a discontinuous mode, the on-time of the PWM pulse is a minimum on-time (3-5 configuration).

Preferably, in the power supply device of the 3-5 configuration, when the load is further reduced in the PWM mode, the switch voltage is brought from the discontinuous mode to an intermittent oscillation mode and the comparison signal is kept at the same logic level over a predetermined mask period, the selector control portion generates the selector control signal such that the mode is brought to an on-time fixed mode where the selector selects the on-time fixed pulse (3-6 configuration).

Preferably, the power supply device of the 3-6 configuration further includes a counter adjustment portion that generates a mask period adjustment signal for adjusting the mask period according to an external control signal input to an external terminal, and that feeds out the mask period adjustment signal to the selector control portion (3-7 configuration).

Preferably, in the power supply device of the 3-1 configuration, the soft start voltage generation portion detects that the soft start voltage exceeds the threshold voltage to generate a soft start completion signal, and the one shot pulse generation portion uses an edge of the soft start completion signal as a trigger to generate the one shot pulse (3-8 configuration).

The vehicle-mounted apparatus disclosed in the present specification includes the power supply device of any one of the 3-1 to 3-8 configurations (3-9 configuration).

The vehicle disclosed in the present specification includes the vehicle-mounted apparatus of the 3-9 configuration and the battery that supplies power to the vehicle-mounted apparatus (3-10 configuration).

[Fourth Technical Feature]

Among the various power supply devices disclosed in the present specification, the power supply device having a fourth technical feature includes: an output transistor that is turned on and off to generate an output voltage from an input voltage; a feedback voltage generation portion that generates a feedback voltage corresponding to the out voltage; an error amplifier that generates an error voltage corresponding to a difference between a predetermined reference voltage and the feedback voltage; an oscillator that generates a clock signal of a predetermined frequency; a slope voltage generation portion that generates a slope voltage in synchronization with the clock signal; a comparator that compares the error voltage and the slope voltage to generate a comparison signal; a PWM pulse generation portion that generates a PWM pulse based on the clock signal and the comparison signal; an on-time fixed pulse generation portion that uses the comparison signal as a trigger to generate an on-time fixed pulse where an on-time and an on-time number are constant; a selector that selects any one of the PWM pulse and the on-time fixed pulse; a driver that turns on and off the output transistor according to an output of the selector; and a selector control portion that generates a control signal of the selector such that any one of the PWM pulse and the on-time fixed pulse is selected according to whether or not the comparison signal is kept at the same logic level over a predetermined mask period (4-1 configuration).

Preferably, in the power supply device of the 4-1 configuration, the comparison signal is such a binary signal that the comparison signal is low when the error voltage is higher than the slope voltage whereas the comparison signal is high when the error voltage is lower than the slope voltage, and the selector control portion includes a counter that measures a period during which the comparison signal is low (4-2 configuration).

Preferably, in the power supply device of the 4-2 configuration, the selector control portion generates, when the period during which the comparison signal is low is shorter than the mask period, the control signal so as to select the PWM pulse whereas the selector control portion generates, when the period during which the comparison signal is low is longer than the mask period, the control signal so as to select the on-time fixed pulse (4-3 configuration).

Preferably, in the power supply device of the 4-3 configuration, the mask period is longer than a pulse period of the clock signal (4-4 configuration).

Preferably, the power supply device of the 4-4 configuration further includes a counter adjustment portion that adjusts the mask period (4-5 configuration).

Preferably, in the power supply device of the 4-3 configuration, a first threshold current when a PWM mode where the PWM pulse is selected is switched to an on-time fixed mode where the on-time fixed pulse is selected is determined by charge that is supplied to a load each time the output transistor is turned on in the PWM mode and a switching period in the PWM mode at a time of a light load (4-6 configuration).

Preferably, in the power supply device of the 4-3 configuration, a second threshold current when an on-time fixed mode where the on-time fixed pulse is selected is switched to a PWM mode where the PWM pulse is selected is determined by charge that is supplied to a load each time the output transistor is turned on N times in the on-time fixed mode and an on-time of each of the on-time fixed pulses (4-7 configuration).

Preferably, in the power supply device of the 4-7 configuration, the second threshold current is expressed by N×Q/Tmask (where N is an on-time number of the on-time fixed pulse, Q is charge that is supplied to the load each time the output transistor is turned on and Tmask is the mask period (4-8 configuration).

Preferably, in the power supply device of the 4-5 configuration, the counter adjustment portion generates a mask period adjustment signal which adjusts the mask period according to an external control signal input from an external terminal and feeds out the mask period adjustment signal to the selector control portion (4-9 configuration).

The vehicle-mounted apparatus disclosed in the present specification includes the power supply device of any one of the 4-1 to 4-9 configurations (4-10 configuration).

The vehicle disclosed in the present specification includes the vehicle-mounted apparatus of the 4-10 configuration and the battery that supplies power to the vehicle-mounted apparatus (4-11 configuration).

<Other Variations>

Although the above embodiments have been described using the examples where the present invention is applied to the vehicle-mounted power supply device, the present invention is not limited to these examples, and can be widely applied to power supply devices used for other applications.

In the various technical features disclosed in the present specification, various modifications as well as the above embodiments are possible without departing from the spirit of its technical creation. For example, the bipolar transistor and the MOS field-effect transistor are freely replaced with each other, and the logic level of various signals is freely inverted. In other words, it should be considered that the above embodiments are illustrative in all respects, not restrictive; it should be understood that the technical scope of the present invention is indicated not by the description of the above embodiments but by the scope of claims and that the meanings equivalent to the scope of claims and all modifications within the scope are included.

INDUSTRIAL APPLICABILITY

The present invention can be applied to, for example, a vehicle-mounted power supply device.

LIST OF REFERENCE NUMERALS 1 power supply device
10 semiconductor device
100 switching control circuit
101 output transistor (P-channel MOS field-effect transistor)
102 driver (invertor)
103 low-level voltage generation portion
104 feedback voltage generation portion
Ra, Rb resistor
105 soft start voltage generation portion
105a current source
105b N-channel MOS field-effect transistor
105c comparator
106 error amplifier
107 oscillator
108 slope voltage generation portion
109 comparator
110 PWM pulse generation portion
111 on-time fixed pulse generation portion
112 one shot pulse generation portion
113 selector control portion (counter)
114 selector
115 comparator
116 comparator
117 OR gate
118 N-channel MOS field-effect transistor
119 on-time fixed pulse adjustment portion
120 on-time fixed pulse cancellation portion (comparator)
121 NOR gate
122 counter adjustment portion
200 internal power supply voltage generation circuit
201 N-channel MOS field-effect transistor
202 operational amplifier
203 pre-regulator portion
204 reference voltage generation portion
205, 206 resistor
300 power switching circuit
301, 302 switch (P-channel MOS field-effect transistor)
303 inverter
L1 coil
D1 diode
R1 to R4 resistor
C1 to C6 capacitor
T1 to T14 external terminal
X vehicle
X11 to X17 vehicle-mounted apparatus

What is claimed is:

1. A power supply device comprising:
a control circuit that turns on and off an output transistor to generate an output voltage from an input voltage;
an internal power supply voltage generation circuit that generates an internal power supply voltage from an external power supply voltage; and
a power switching circuit that switches supply of the internal power supply voltage and supply of the output voltage as a drive voltage of the control circuit.

2. The power supply device of claim 1,
wherein the control circuit includes a soft start voltage generation portion that generates a soft start voltage which starts to gently increase after the power supply device is started up, and
the power switching circuit performs power switching control according to whether or not the soft start voltage exceeds a predetermined threshold voltage.

3. The power supply device of claim 1,
wherein the power switching circuit performs power switching control according to whether or not the output voltage or a feedback voltage corresponding to the output voltage falls within a normal range.

4. The power supply device of claim 1,
wherein the power switching circuit performs power switching control according to whether or not a state where the power supply device is forcibly stopped is cancelled.

5. The power supply device of claim 2,
wherein the soft start voltage generation portion uses a current source and a transistor connected in series to the current source and thereby performs charge and discharge control on a capacitor connected to a connection node between the current source and the transistor so as to control the soft start voltage.

6. The power supply device of claim 5,
wherein the soft start voltage generation portion turns on the transistor to discharge the soft start voltage when a forcible stop signal of the power supply device is input, and the power switching circuit performs, when the forcible stop signal is input, power switching such that the internal power supply voltage is supplied as the drive voltage of the control circuit.

7. The power supply device of claim 6,
wherein the control circuit includes a logical operation circuit to which a soft start completion signal, the forcible stop signal and an abnormal detection signal are input, and the power switching circuit performs, based on an output of the logical operation circuit, when soft start is completed, forcible stop is cancelled and abnormality is not detected, power switching such that the output voltage is supplied as the drive voltage of the control circuit.

8. The power supply device of claim 2,
wherein, when the power supply device is started up, until the soft start voltage is increased to the threshold voltage, the power switching circuit performs power switching such that the internal power supply voltage is supplied as the drive voltage of the control circuit.

9. The power supply device of claim 1,
wherein the internal power supply voltage generation circuit includes:
a pre-regulator circuit that generates an internal voltage from the external power supply voltage; and
a reference voltage generation portion that receives the internal voltage generated by the pre-regulator circuit to generate a constant reference voltage used for generation of the internal power supply voltage.

10. A vehicle-mounted apparatus comprising the power supply device of claim 1.

11. A vehicle comprising:
the vehicle-mounted apparatus of claim 10; and
a battery that supplies power to the vehicle-mounted apparatus.

* * * * *